United States Patent
Hirai

(10) Patent No.: US 8,902,435 B2
(45) Date of Patent: Dec. 2, 2014

(54) POSITION DETECTION APPARATUS AND IMAGE DISPLAY APPARATUS

(71) Applicant: Funai Electric Co., Ltd., Osaka (JP)

(72) Inventor: Tomohisa Hirai, Osaka (JP)

(73) Assignee: Funai Electric Co., Ltd., Osaka (JP)

(*) Notice: Subject to any disclaimer, the term of this patent is extended or adjusted under 35 U.S.C. 154(b) by 0 days.

(21) Appl. No.: 14/030,566

(22) Filed: Sep. 18, 2013

(65) Prior Publication Data
US 2014/0078516 A1    Mar. 20, 2014

(30) Foreign Application Priority Data
Sep. 19, 2012    (JP) ................................ 2012-206008

(51) Int. Cl.
| | |
|---|---|
| G01B 11/14 | (2006.01) |
| G06F 3/041 | (2006.01) |
| G06F 3/03 | (2006.01) |
| G06F 3/042 | (2006.01) |

(52) U.S. Cl.
CPC ............... *G01B 11/14* (2013.01); *G06F 3/041* (2013.01); *G06F 3/0304* (2013.01); *G06F 3/0421* (2013.01); *G06F 3/03* (2013.01); *G06F 2203/04101* (2013.01)
USPC ......................................... 356/614; 356/621

(58) Field of Classification Search
None
See application file for complete search history.

(56) References Cited

U.S. PATENT DOCUMENTS

| | | | | |
|---|---|---|---|---|
| 5,525,764 | A * | 6/1996 | Junkins et al. | 178/18.01 |
| 6,911,972 | B2 * | 6/2005 | Brinjes | 345/175 |
| 7,307,661 | B2 * | 12/2007 | Lieberman et al. | 348/333.1 |
| 8,373,678 | B2 * | 2/2013 | Yamada | 345/175 |

FOREIGN PATENT DOCUMENTS

JP        2009-258569 A       11/2009

* cited by examiner

*Primary Examiner* — Kara E Geisel
*Assistant Examiner* — Jarreas C Underwood
(74) *Attorney, Agent, or Firm* — Baker & Hostetler LLP

(57) ABSTRACT

This position detection apparatus includes a plurality of light receiving portions receiving a reflected laser beam from an indicator, a lens, a masking portion arranged between the light receiving portions and the lens, having a masking surface restricting the reflected laser beam guided to the light receiving portions in a direction orthogonal to a projection surface, and a determination portion determining a three-dimensional position in a projection image indicated by the indicator. The masking surface of the masking portion has such a concave shape that opposing ends thereof are closer to the lens than a central portion thereof.

20 Claims, 11 Drawing Sheets

POSITION DETECTION APPARATUS AND IMAGE DISPLAY APPARATUS

CROSS-REFERENCE TO RELATED APPLICATIONS

The present application claims the benefit of Japanese Application Serial No. 2012-206008, with a filing date of Sep. 19, 2012.

BACKGROUND OF THE INVENTION

1. Field of the Invention

The present invention relates to an image display apparatus projecting an image with a laser beam and a position detection apparatus detecting the position of an indicator with respect to a projection image.

2. Description of the Background Art

An image display apparatus, such as a laser projector, projecting an image on a projection surface with a laser beam is put to practical use. In such an image display apparatus, a technology to detect a position in a projection image pointed by a user is known.

Japanese Patent Laying-Open No. 2009-258569 discloses an electronic device scanning a beam from an infrared laser by a part of a MEMS mirror of a projector module, rendering the beam parallel to an installation surface by a reflective mirror, and making the infrared beam reflected from a finger incident on a photodiode by a beam splitter when the finger touches a prescribed area of a projection image to measure a distance to the finger through a TOF method by distance measuring means. This electronic device detects the position of the finger in the two-dimensional surface of the projection image.

A user interface employing a projection image as a touch operation surface has been developed. This user interface is employed as a user interface of a personal computer or the like, for example, to detect an indication point, recognize that an icon in a projection image has been selected, and accomplish prescribed processing when a user indicates the icon with the finger or the like.

Although the user interface can detect the position and movement of the finger in a plane surface by detecting the indication point of the projection image in a two-dimensional surface, the user interface cannot detect an indication point in a direction perpendicular to the plane surface. In other words, the user interface cannot detect an indication point in three-dimensional space, and the number of user's operations that can be recognized is limited when the aforementioned user interface is employed.

Furthermore, a technology to project an image for a right eye and an image for a left eye to allow a user viewing these to recognize these as a three-dimensional image has been developed, for example. When this technology is employed in a user interface for a three-dimensional image, the user interface cannot detect an indication point in the height direction, so that the user interface cannot sufficiently function as a user interface.

SUMMARY OF THE INVENTION

The present invention has been proposed in order to solve the aforementioned problem, and an object of the present invention is to detect the three-dimensional position of an indicator with respect to a projection image.

A position detection apparatus according to a first aspect of the present invention includes a plurality of light receiving portions arranged at different heights from a projection surface on which an image is projected by scanning a laser beam, receiving a reflected laser beam from an indicator indicating a part of a projection image, a lens guiding the reflected laser beam from the indicator to the light receiving portions, a masking portion arranged between the light receiving portions and the lens to extend in a direction parallel to the projection surface, having a masking surface restricting the reflected laser beam guided to the light receiving portions in the height direction orthogonal to the projection surface, and a determination portion determining a three-dimensional position in the projection image indicated by the indicator on the basis of detection results of the plurality of light receiving portions, while the masking surface of the masking portion has such a concave shape that opposing ends thereof are closer to the lens than a central portion thereof.

In the position detection apparatus according to the first aspect of the present invention, as hereinabove described, when the indicator such as an implement such as a pointer or the finger of a user indicates a part of the projection image, the position of the indicator on a plane parallel to the projection surface can be detected on the basis of the scan timing and the timing of receiving the reflected laser beam by the light receiving portions, and these light receiving portions are arranged at the different heights from the projection surface, so that the determination portion can determine a position in the projection image indicated by the indicator in the plane parallel to the projection surface and in the height direction orthogonal to the projection surface on the basis of the detection results of these light receiving portions. Thus, the three-dimensional position of the indicator with respect to the projection image can be detected. Furthermore, according to where the indicator is located with respect to the projection image having a certain width, aberration is generated in the reflected laser beam guided to the light receiving portions by the lens. For example, the spot diameter of the reflected laser beam guided by the lens on the light receiving portions becomes larger when the indicator is located at an end of the projection image than when the indicator is located at a central portion of the projection image, but the masking surface of the masking portion has a concave curved shape, so that the reflected laser beam can be restricted at a position where the spot diameter of the reflected laser beam is not large. Thus, erroneous detection of the light receiving portions can be prevented in the height direction orthogonal to the projection surface.

In the aforementioned position detection apparatus according to the first aspect, the masking surface of the masking portion preferably has such a curved shape that the opposing ends thereof are closer to the lens than the central portion thereof. According to this structure, the reflected laser beam requiring restriction can be easily masked by the masking surface having the curved shape, and hence erroneous detection of the light receiving portions can be reliably prevented.

In the aforementioned structure in which the masking surface of the masking portion has the curved shape, the masking surface of the masking portion preferably has the curved shape connecting positions where the spot diameter of the reflected laser beam guided from the lens to the light receiving portions is a prescribed value. According to this structure, the reflected laser beam requiring restriction can be efficiently masked before the spot diameter of the reflected laser beam becomes larger than the prescribed value. Thus, the reflected laser beam is effectively restricted with respect to the aberration of the reflected laser beam, and hence erroneous detection of the light receiving portions can be more reliably prevented.

In this case, the masking surface of the masking portion preferably has the curved shape connecting positions where the spot diameter of the reflected laser beam guided from the lens to the light receiving portions is minimized. According to this structure, the reflected laser beam requiring restriction can be effectively masked at the position where the spot diameter of the reflected laser beam is minimized. Thus, the reflected laser beam is effectively restricted with respect to the aberration of the reflected laser beam, and hence erroneous detection of the light receiving element portions can be more reliably prevented.

In the aforementioned structure in which the masking surface of the masking portion has the curved shape, the masking surface of the masking portion preferably has the curved shape connecting positions where the peak of the distribution of the point image intensity of the spot of the reflected laser beam guided from the lens to the light receiving portions is maximized. According to this structure, the reflected laser beam requiring restriction can be effectively masked at the position where the peak of the distribution of the point image intensity of the spot of the reflected laser beam is maximized. Thus, the reflected laser beam is effectively restricted with respect to the aberration of the reflected laser beam, and hence erroneous detection of the light receiving portions can be more reliably prevented.

In the aforementioned structure in which the masking surface of the masking portion has the curved shape, the masking surface of the masking portion preferably has the curved shape connecting the light condensing points of the reflected laser beam guided from the lens to the light receiving portions. According to this structure, the reflected laser beam requiring restriction can be effectively masked at the position of the light condensing point of the reflected laser beam. Thus, the reflected laser beam is effectively restricted with respect to the aberration of the reflected laser beam, and hence erroneous detection of the light receiving portions can be more reliably prevented.

In the aforementioned position detection apparatus according to the first aspect, the determination portion is preferably configured to determine a user's operation with the indicator on the projection image in a region divided in the height direction on the basis of a combination of the detection results of the plurality of light receiving portions. According to this structure, a prescribed operation of the user with the indicator in the region divided in the height direction can be easily determined.

In the aforementioned position detection apparatus according to the first aspect, the determination portion is preferably configured to determine dragging and dropping operations with the indicator on an icon image in the projection image on the basis of a combination of the detection results of the plurality of light receiving portions. According to this structure, it can be determined that the user has dragged and dropped the icon in the projection image with the finger or the like on the basis of the combination of the detection results of the plurality of light receiving portions, and hence the position detection apparatus can be employed as the user interface of a personal computer or the like, for example.

In the aforementioned position detection apparatus according to the first aspect, the masking surface of the masking portion is preferably configured to block the reflected laser beam guided to the light receiving portions according to the height of the indicator in the height direction orthogonal to the projection surface. According to this structure, the reflected laser beam guided to the light receiving portions is restricted according to the height position of the indicator, and hence the height position of the indicator can be easily determined on the basis of a non-restricted laser beam.

In the aforementioned position detection apparatus according to the first aspect, the masking portion is preferably formed by curving a plate-like member. According to this structure, the masking surface of the masking portion can be easily formed concavely.

In the aforementioned position detection apparatus according to the first aspect, the light receiving portions preferably include a first light receiving portion and a second light receiving portion arranged at a position higher than the position of the first light receiving portion in the height direction orthogonal to the projection surface, and the determination portion is preferably configured to determine the height position of the indicator in the height direction orthogonal to the projection surface on the basis of a combination of detection results of the first light receiving portion and the second light receiving portion. According to this structure, the height position of the indicator can be accurately determined on the basis of the combination of the detection results of the first light receiving portion and the second light receiving portion.

In this case, the determination portion is preferably configured to determine the three-level height positions of the indicator in the height direction orthogonal to the projection surface on the basis of combinations of detection results of the first light receiving portion and the second light receiving portion. According to this structure, the three-level height positions of the indicator can be easily determined with a simple structure employing the two light receiving portions.

In the aforementioned position detection apparatus according to the first aspect, the light receiving portions are preferably configured to extend in the direction parallel to the projection surface. According to this structure, the reflected laser beam can be detected widely in the direction parallel to the projection surface.

In the aforementioned position detection apparatus according to the first aspect, the laser beam is preferably scanned by a MEMS (micro electro mechanical system) scan mirror. According to this structure, by employing the MEMS scan mirror, the size of a scan portion can be reduced, the power consumption of the scan portion can be reduced, and the processing speed of the scan portion can be increased.

In the aforementioned position detection apparatus according to the first aspect, a three-dimensional image is preferably projected by scanning the laser beam, and the determination portion is preferably configured to determine a three-dimensional position in a three-dimensional projection image indicated by the indicator on the basis of the detection results of the plurality of light receiving portions. According to this structure, a prescribed operation of the user in the three-dimensional image can be easily detected.

An image display apparatus according to a second aspect of the present invention includes a laser beam source portion outputting a laser beam, a scan portion scanning the laser beam output from the laser beam source portion to project an image on a projection surface, a plurality of light receiving portions arranged at different heights from the projection surface, receiving a reflected laser beam from an indicator indicating a part of a projection image, a lens guiding the reflected laser beam from the indicator to the light receiving portions, a masking portion arranged between the light receiving portions and the lens to extend in a direction parallel to the projection surface, having a masking surface restricting the reflected laser beam guided to the light receiving portions in the height direction orthogonal to the projection surface, and a determination portion determining a three-dimensional position in the projection image indicated by the indicator on the basis of detection results of the plurality of light receiving portions, while the masking surface of the masking portion has such a concave shape that opposing ends thereof are closer to the lens than a central portion thereof.

In the image display apparatus according to the second aspect of the present invention, as hereinabove described, when the indicator such as an implement such as a pointer or the finger of a user indicates a part of the projection image, the position of the indicator on a plane parallel to the projection surface can be detected on the basis of the scan timing and the timing of receiving the reflected laser beam by the light receiving portions, and these light receiving portions are arranged at the different heights from the projection surface, so that the determination portion can determine a position in the projection image indicated by the indicator in the plane parallel to the projection surface and in the height direction orthogonal to the projection surface on the basis of the detection results of these light receiving portions. Thus, the three-dimensional position of the indicator with respect to the projection image can be detected. Furthermore, according to where the indicator is located with respect to the projection image having a certain width, aberration is generated in the reflected laser beam guided to the light receiving portions by the lens. For example, the spot diameter of the reflected laser beam guided by the lens on the light receiving portions becomes larger when the indicator is located at an end of the projection image than when the indicator is located at a central portion of the projection image, but the masking surface of the masking portion has a concave curved shape, so that the reflected laser beam can be restricted at a position where the spot diameter of the reflected laser beam is not large. Thus, erroneous detection of the light receiving portions can be prevented in the height direction orthogonal to the projection surface.

In the aforementioned image display apparatus according to the second aspect, the masking surface of the masking portion preferably has such a curved shape that the opposing ends thereof are closer to the lens than the central portion thereof. According to this structure, the reflected laser beam requiring restriction can be easily masked by the masking surface having the curved shape, and hence erroneous detection of the light receiving portions can be reliably prevented.

In the aforementioned image display apparatus according to the second aspect, the determination portion is preferably configured to determine a user's operation with the indicator on the projection image in a region divided in the height direction on the basis of a combination of the detection results of the plurality of light receiving portions. According to this structure, a prescribed operation of the user in the region divided in the height direction can be easily determined.

In the aforementioned image display apparatus according to the second aspect, the determination portion is preferably configured to determine dragging and dropping operations with the indicator on an icon image in the projection image on the basis of a combination of the detection results of the plurality of light receiving portions. According to this structure, it can be determined that the user has dragged and dropped the icon in the projection image with the finger or the like on the basis of the combination of the detection results of the plurality of light receiving portions, and hence the image display apparatus can be employed as the user interface of a personal computer or the like, for example.

In the aforementioned image display apparatus according to the second aspect, the masking surface of the masking portion preferably has a curved shape connecting positions where the spot diameter of the reflected laser beam guided from the lens to the light receiving portions is a prescribed value. According to this structure, the reflected laser beam requiring restriction can be efficiently masked before the spot diameter of the reflected laser beam becomes larger than the prescribed value. Thus, the reflected laser beam is effectively restricted with respect to the aberration of the reflected laser beam, and hence erroneous detection of the light receiving portions can be more reliably prevented.

A functional portion such as the determination portion according to the present invention can have a circuit configuration employing an electronic component and also can be configured as a functional module employing computer hardware and software and so configured that the computer hardware executes the software.

According to the present invention, the three-dimensional position of an indication point with respect to the projection image can be detected.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention is hereinafter described with reference to the drawings.

Figure 1:
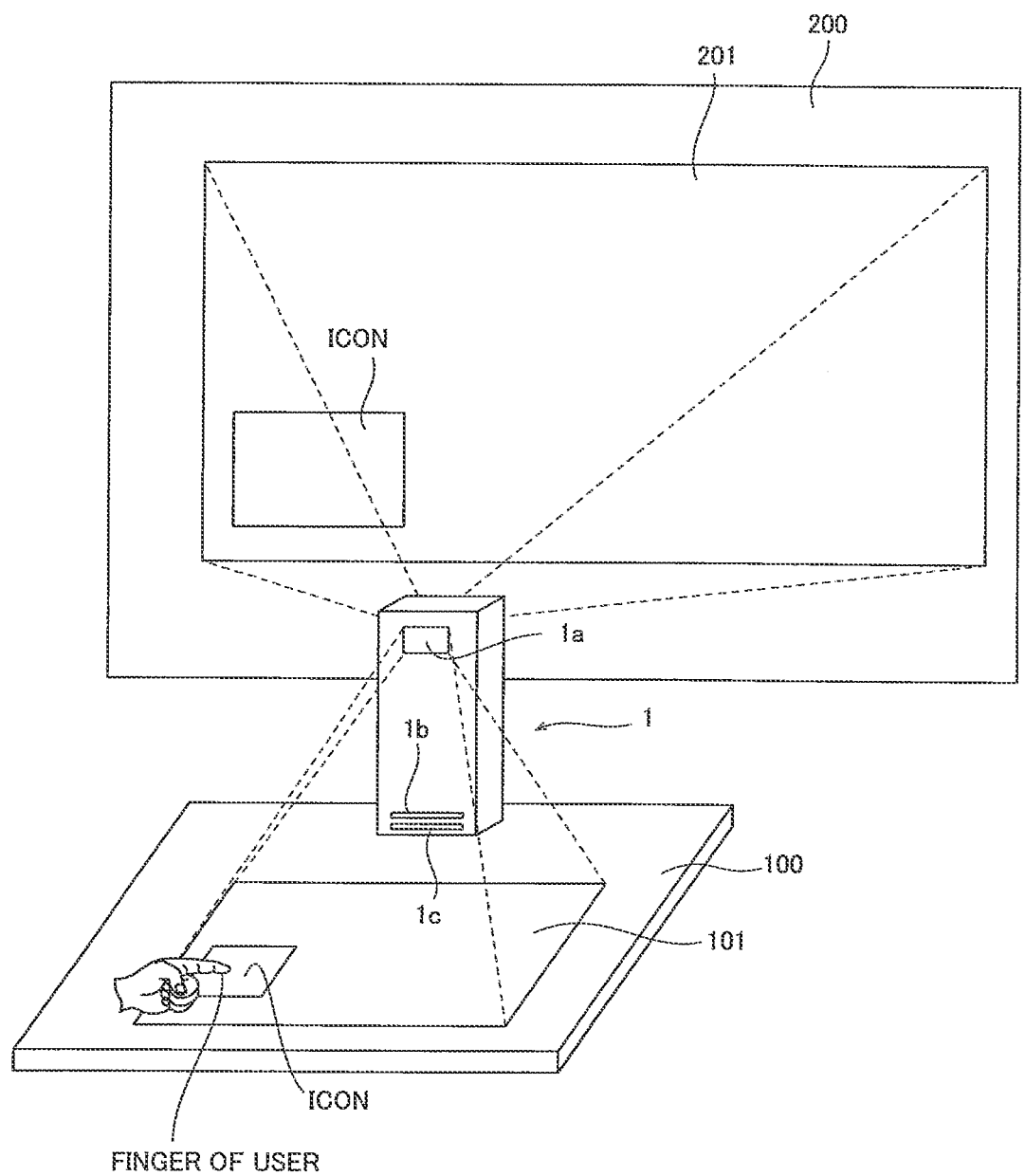
FIG. 1 is a perspective view showing the external appearance of an image display apparatus according to an embodiment of the present invention.

FIG. 1 illustrates a laser projector 1 according to the embodiment of the present invention. This laser projector 1 incorporates a position detection apparatus according to the embodiment of the present invention. The laser projector 1 according to this embodiment is set on a table 100, for example, projects and displays the same image projected by scanning a laser beam as a display image 201 on a projection surface 200 such as a screen, and projects and displays the image as an operation image 101 on a projection surface such as the upper surface of the table 100. In an example shown in the figure, a laser beam is emitted from a window 1a of a projector housing provided on the side opposite to the side of the projector housing from which the display image 201 is projected, whereby the operation image 101 is projected. The laser projector 1 is an example of the "image display apparatus" in the present invention.

The laser projector 1 according to this embodiment projects the display image 201 in a relatively large size for presentation and projects the operation image 101 in a relatively small size as a user interface on which a user performs a touch operation. In the example described below, when the user operates an icon in the operation image 101 with the finger, it is considered that the user operates an icon in the display image 201, and prescribed processing corresponding to an operation on the icon such as an operation of moving the icon by dragging and dropping operations or an operation of projecting and displaying an image of another file is performed.

According to this embodiment, the position of a fingertip is detected as described later, employing the fingertip indicating a part of the operation image 101 such as the icon as an indicator, but various implements such as a pointer can be employed so far as the same reflects a laser beam necessary for detection. In order to detect an indication point more clearly, the reflectance of the indicator is preferably higher than those of the other portions. For example, the nail of the finger or a mirror surface portion provided on the tip of the pointer preferably serves as the indicator of a detection object. In the example shown in the figure, a laser beam reflected from the fingertip of the user is incident on the position detection apparatus provided in the projector housing through two windows 1b and 1c provided at different height positions on the leg of the projector housing.

This image display apparatus (laser projector) simultaneously displaying the same image as the display image 201 and the operation image 101 can be utilized for various purposes other than presentation. When the image display apparatus includes an information processing function as in a personal computer, for example, the display image 201 can be utilized as a display screen and the operation image 101 can be utilized as an input portion of a user's operation.

Figure 2:
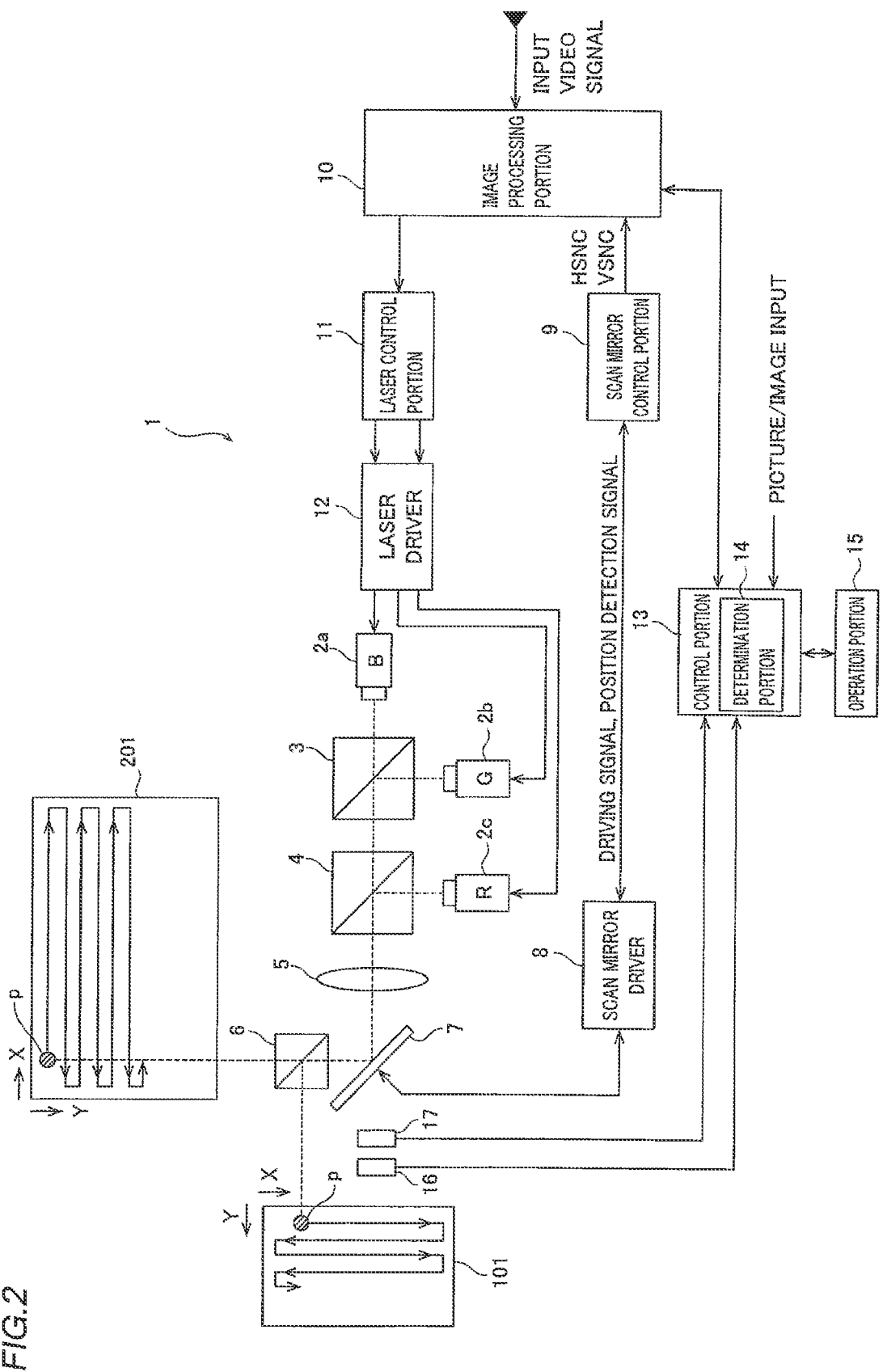
FIG. 2 is a block diagram of main sections of the image display apparatus according to the embodiment of the present invention.

FIG. 2 illustrates the structure of main sections of the laser projector 1 according to this embodiment. This laser projector 1 is mainly constituted by laser beam sources 2a to 2c, various optical elements 3 to 6, a scan mirror 7, various drive/control units 8 to 14, an operation portion 15 for inputting a user's operation such as the setting of the laser projector 1, and two photoreceivers 16 and 17. The laser projector 1 synthesizes laser beams of red (R), green (G), and blue (B) color components and thereafter scans this synthesized beam by the scan mirror 7 to project a color image according to an input video signal as the display image 201 and the operation image 101. The input video signal is a still image signal or a moving image signal input from a personal computer, a memory device, or the like. The scan mirror 7 is an example of the "scan portion" in the present invention.

The individual laser beam sources 2a to 2c are laser diodes (LDs) outputting laser beams of color components different from each other and are driven independently of each other by drive currents individually supplied from the laser driver 12 to output laser beams of single color components. Thus, the laser beams of the single color components of specified wavelengths are emitted such that a laser beam of a blue color component (B) is emitted from the laser beam source 2a, a laser beam of a green color component (G) is emitted from the laser beam source 2b, and a laser beam of a red color component (R) is emitted from the laser beam source 2c. The laser beam sources 2a to 2c are examples of the "laser beam source portion" in the present invention.

The dichroic mirrors 3 and 4 transmit only laser beams of specified wavelengths and reflect the others thereby synthesizing the laser beams of the color components of R, G, and B emitted from the laser beam sources 2a to 2c. Specifically, the laser beams of the blue color component and the green color component emitted from the laser beam sources 2a and 2b are synthesized in the dichroic mirror 3 on the upstream of an optical path, and thereafter are emitted to the dichroic mirror 4 on the downstream of the optical path. This emitted synthesized beam and the laser beam of the red color component emitted from the laser beam source 2c are further synthesized in the dichroic mirror 4, and are emitted as a targeting final color-synthesized beam. The color-synthesized beam synthesized in the dichroic mirrors 3 and 4 is collected by the lens 5 and is incident on the scan mirror 7.

According to this embodiment, as the scan mirror 7, a MEMS scan mirror advantageous for downsizing, low power consumption, speeding up of processing, etc. is employed. The scan mirror 7 is displaced in a horizontal direction (direction X) and a vertical direction (direction Y) by the scan mirror driver 8 into which a driving signal is input from the scan mirror control portion 9, reflects the color beam incident on the scan mirror 7 according to the deflection angle of the scan mirror 7, scans a pixel spot p with the color beam in the horizontal and vertical directions on the screen 200 and the table 100, and projects and displays the display image 201 and the operation image 101. Information about the scan position of the pixel spot p for projecting an image is input from the image processing portion 10 into the scan mirror control portion 9 and the laser control portion 11, and a color pixel with respect to each scan position is projected as the pixel spot p.

The color-synthesized laser beam for projecting these display image 201 and operation image 101 is emitted from windows (the window 1a for the operation image 101 and a similar window for the display image 201) provided on the housing of the laser projector, and the light branching unit 6 is provided in an optical path from the scan mirror 7 to these windows. The light branching unit reflects and transmits the color-synthesized laser beam reflected from the scan mirror 7 to branch the same. The display image 201 and the operation image 101 are projected and displayed with these branched color-synthesized laser beams.

The image processing portion 10 transmits video data to the laser control portion 11 at prescribed time intervals on the basis of the input video signal, whereby the laser control portion 11 obtains pixel information in a prescribed scan position. The laser control portion 11 outputs a drive current signal for scanning the pixel spot p in a projection range on the basis of the pixel information to the laser driver 12 and controls light emission outputs from the laser beam sources 2a to 2c in order to project the display image 201 and the operation image 101.

The laser driver 12 drives the laser beam sources 2a to 2c to allow the laser beam sources 2a to 2c to emit the laser beams on the basis of the aforementioned control performed by the laser control portion 11. The laser beam sources 2a to 2c emit the laser beams when currents equal to or greater than an oscillation threshold current are supplied from the laser driver 11 and output the laser beams having larger outputs (light quantities) as the values of the supplied currents increase. Furthermore, the laser beam sources 2a to 2c stop outputting the laser beams when currents less than the oscillation threshold current are supplied. According to this embodiment, as the laser beam sources 2a to 2c, the laser diodes (LDs) are employed.

The photoreceivers 16 and 17 are arranged at different height positions from the upper surface (operation image 101) of the table 100 correspondingly to the two windows 1c and 1b shown in FIG. 1. According to this embodiment, the photoreceiver 16 faces the operation image 101 at a height substantially equal to or slightly higher than the height of the operation image 101 through the window 1c, and the photoreceiver 17 faces the operation image 101 at a height slightly higher than the height of the photoreceiver 16 through the window 1b. These photoreceivers 16 and 17 have light receiving elements such as photodiodes receiving a laser beam and receive a laser beam reflected from the fingertip of the user, as described later.

The control portion 13 and the photoreceivers 16 and 17 independently constitute the position detection apparatus, and the control portion 13 has the determination portion 14 determining the position of a part of the operation image indicated by the fingertip of the user (and an operation movement indicated by a change of the position). A signal indicating that the reflected laser beam has been received by the photoreceivers 16 and 17 is input into the control portion 13, and the information about the scan position of the pixel spot p for projecting an image is input from the image processing portion 10 into the control portion 13, similarly to the scan mirror control portion 9 and the laser control portion 11.

The determination portion 14 determines a reflection position in a plane parallel to the operation image 101 (table 100) from the timing at which the photoreceivers 16 and 17 has received the reflected laser beam and a scan position at that timing on the basis of the input into the control portion 13. In other words, the determination portion 14 determines the two-dimensional position of the fingertip of the user in the plane parallel to the operation image 101. In addition, the determination portion 14 determines a reflection position (the position of the fingertip of the user) in the operation image 101 in a direction orthogonal (i.e., vertical) to the table 100 (projection surface), as described later, on the basis of whether the photoreceiver 16 or the photoreceiver 17 receives the reflected laser beam.

Therefore, the determination portion 14 determines the three-dimensional position of the fingertip of the user indicating the icon or the like in the operation image 101 on the basis of the aforementioned two-dimensional position and height position. The control portion 13 inputs image data representing that the icon is moved by the dragging and dropping operations, for example, into the image processing portion 10 in response to the determination of the determination portion 14 and reflects the image data in the display image 201 and the operation image 101.

Figure 3:
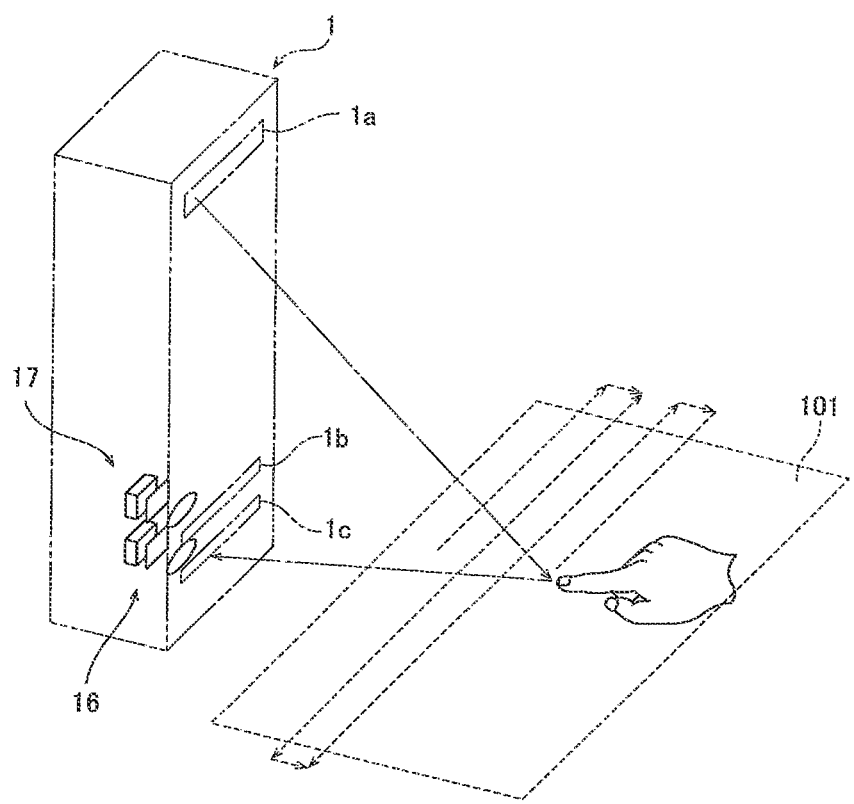
FIG. 3 is a perspective view for illustrating the function of the image display apparatus according to the embodiment of the present invention.

The structure of the photoreceivers 16 and 17 is now described in detail. As shown in FIG. 3, when the fingertip of the user indicates a part of the operation image 101, a projection laser beam (color-synthesized laser beam) emitted from the window 1a is reflected from the fingertip and the reflected laser beam is incident on the windows 1b and 1c. The reflected laser beam is incident on the windows 1b and 1c similarly regardless of the position of the fingertip of the user in the operation image 101. The laser beam diffusely reflected from the indicator such as the fingertip of the user is incident on the windows 1b and 1c similarly in both cases where the laser beam is reflected in a central portion of the operation image 101 and where the laser beam is reflected in an end of the operation image 101.

Figure 4:
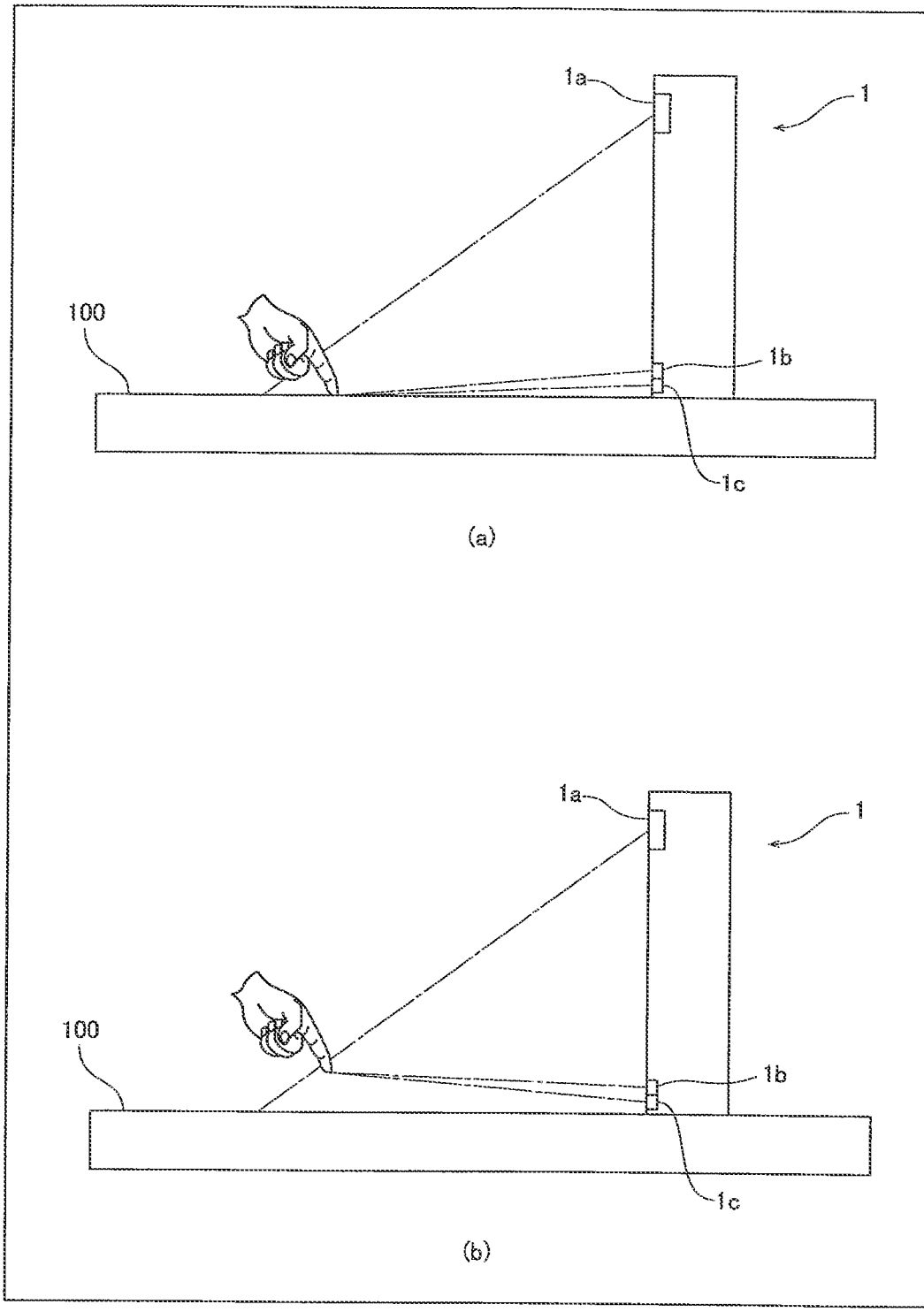
FIG. 4 is a side elevational view for illustrating the function of the image display apparatus according to the embodiment of the present invention; view (a) and view (b) show different angles of reflected laser beams dependent upon the height position of the user's fingertip.

Furthermore, as shown in FIG. 4, the reflected laser beam is incident on the windows 1b and 1c similarly also when the fingertip of the user is located in the vertical direction of the operation image 101 (in the direction orthogonal to the upper surface of the table 100). The laser beam reflected from the fingertip located on the upper surface of the table 100 as shown in view (a) of FIG. 4 and the laser beam reflected from the fingertip located in a position separated upward from the upper surface of the table 100 as shown in view (b) of FIG. 4 are incident on the windows 1b and 1c similarly. However, in views (a) and (b) of FIG. 4, the angles of the laser beams incident on the windows 1b and 1c are different according to the height position of the fingertip.

Figure 5:
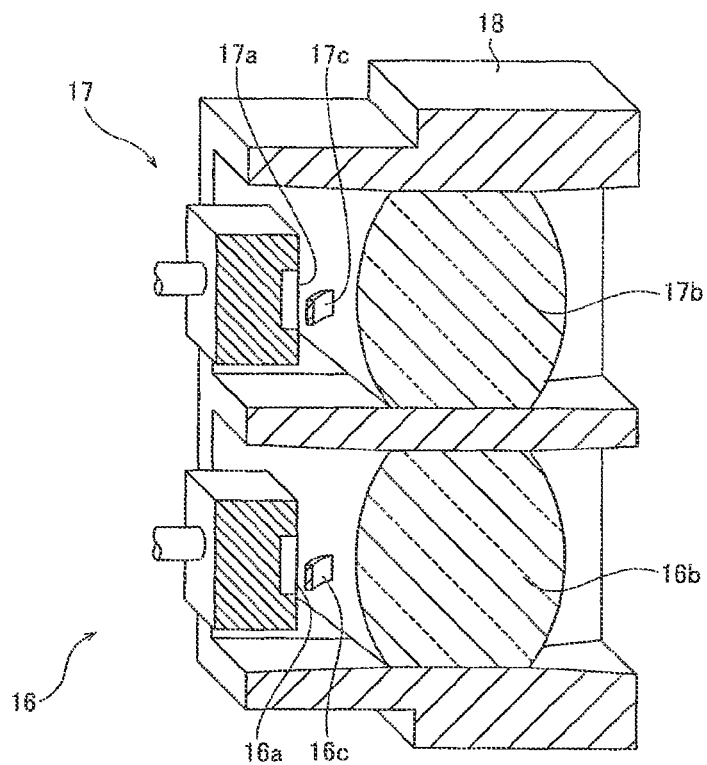
FIG. 5 is a sectional view showing the structure around a light receiving portion of the image display apparatus according to the embodiment of the present invention.

The photoreceivers 16 and 17 are provided in a case 18 incorporated in the laser projector 1 at the different height positions correspondingly to the windows 1b and 1c, as shown in FIG. 5. The photoreceiver 16 has a light receiving element 16a detecting application of the reflected laser beam, a lens 16b collecting the reflected laser beam incident from the window 1c and guiding the collected laser beam to the light receiving element 16a, and a plate-like masking member 16c arranged between the light receiving element 16a and the lens 16b, having a height sufficient to cover almost the lower half portion of the light receiving element 16a. The photoreceiver 17 is similar to the photoreceiver 16 and has a light receiving element 17a, a lens 17b collecting the reflected laser beam incident from the window 1b and guiding the collected laser beam to the light receiving element 17a, and a plate-like masking member 17c having a height sufficient to cover almost the lower half portion of the light receiving element 17a. The light receiving element 16a is an example of the "light receiving portion" or the "first light receiving portion" in the present invention, and the light receiving element 17a is an example of the "light receiving portion" or the "second light receiving portion" in the present invention. The masking members 16c and 17c are examples of the "masking portion" in the present invention.

Figure 6:
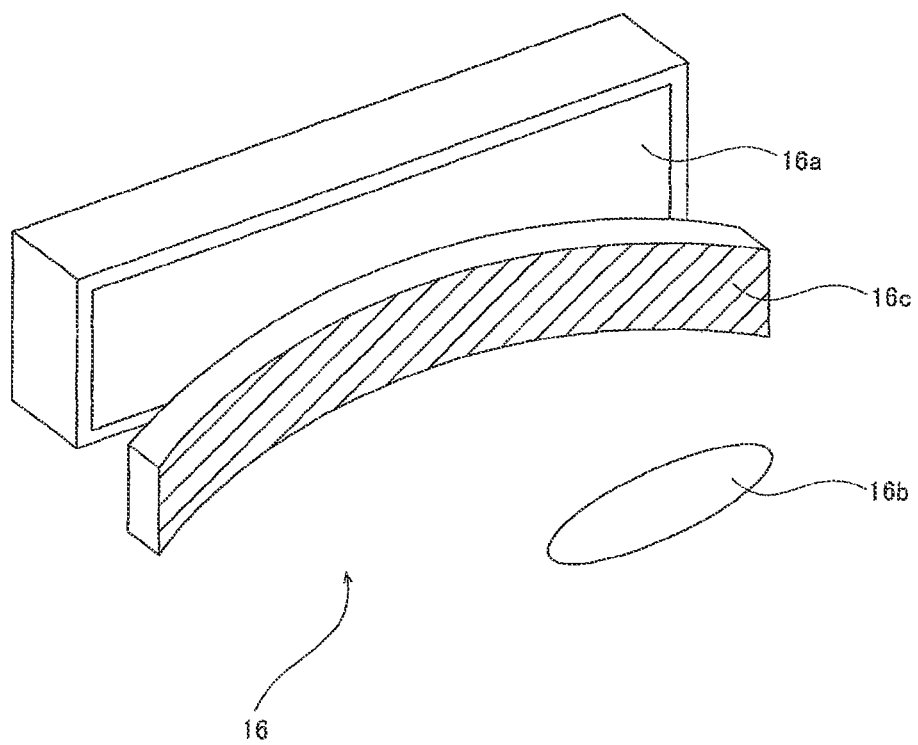
FIG. 6 is a perspective view showing the structure around the light receiving portion of the image display apparatus according to the embodiment of the present invention.
Figure 7:
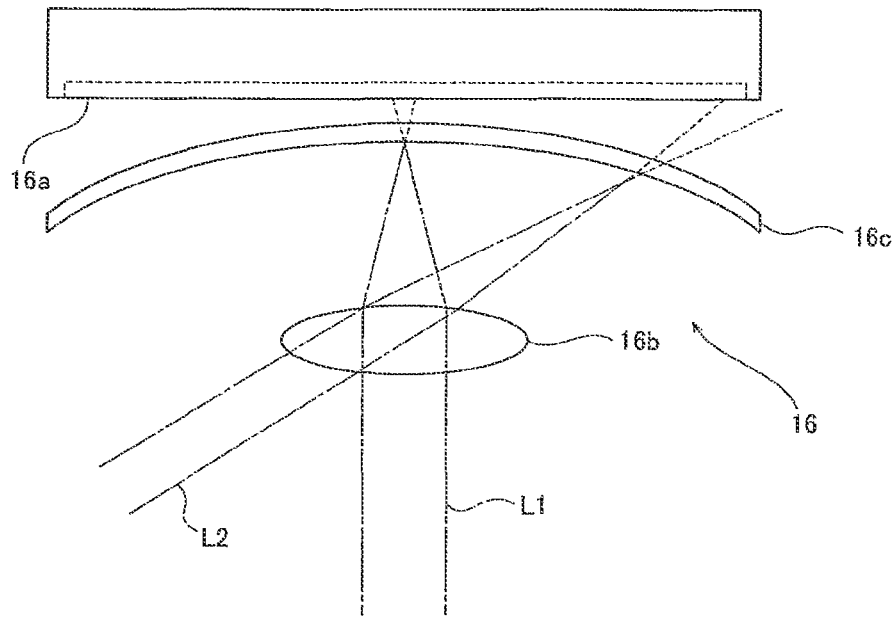
FIG. 7 is a plan view showing the structure around the light receiving portion of the image display apparatus according to the embodiment of the present invention.
Figure 8:
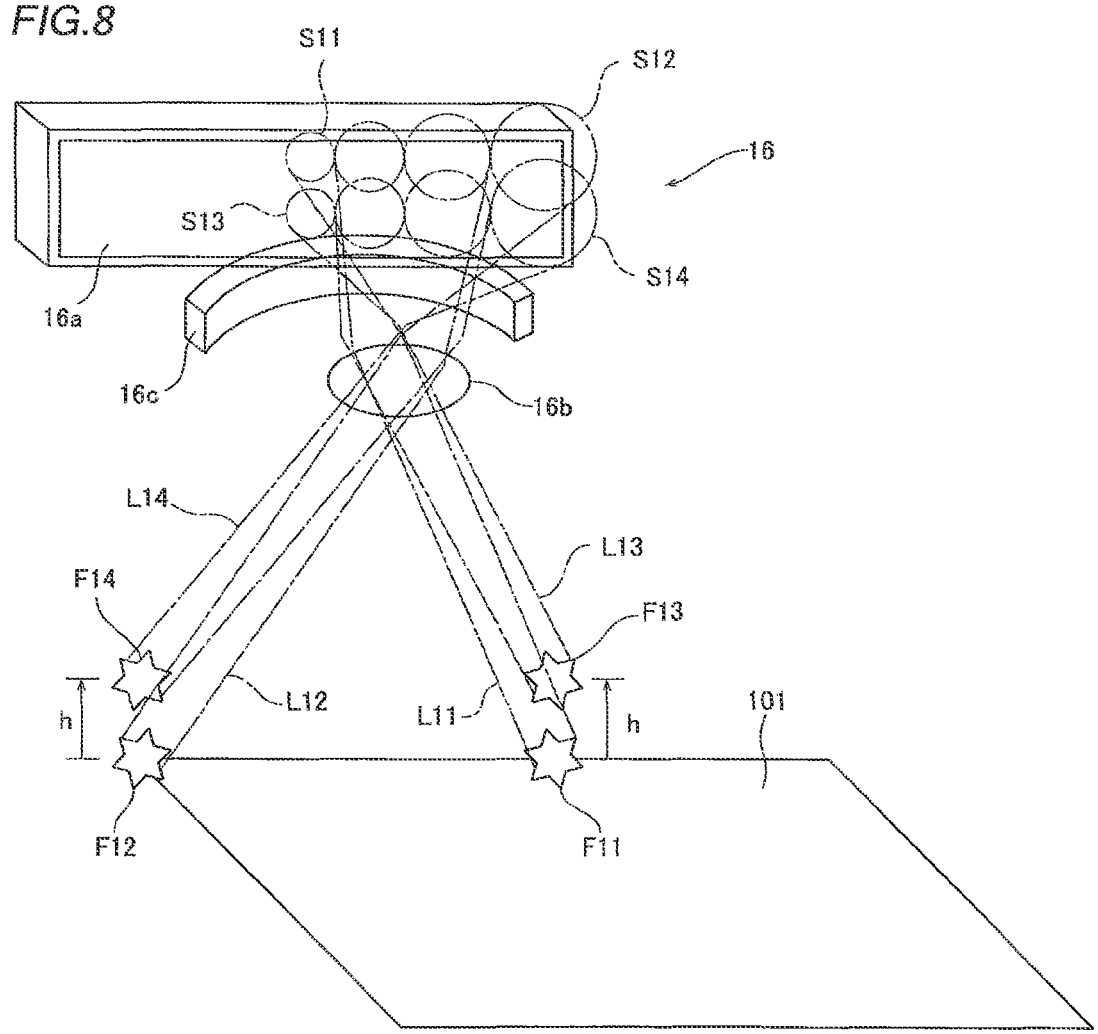
FIG. 8 is a perspective view for illustrating the function of a masking portion of the image display apparatus according to the embodiment of the present invention.

The masking members 16c and 17c are in the same shape and have widths in the same direction correspondingly to the light receiving elements 16a and 17a having widths in the width direction (direction X) of the operation image 101. As the photoreceiver 16 is shown in FIGS. 6 to 8 as a representative, the masking member 16c has such a curved shape that opposing ends thereof are closer to the lens 16b than a central portion thereof and blocks the reflected laser beam according to the incidence angle to the light receiving element 16a to restrict application to the light receiving element 16a. Furthermore, the masking member 16c has a masking surface (hatching portion) blocking the reflected laser beam to restrict application to the light receiving element 16a in a position opposed to the lens 16b, as shown in FIG. 6.

As shown in FIG. 8, while laser beams L11 and L12 reflected from the fingertips F11 and F12 of the user located at a height substantially equal to the height of the upper surface (operation image 101) of the table 100 are collected by the lens 16b and are applied to almost the upper half portion of the light receiving element 16a as spots S11 and S12, laser beams L13 and L14 reflected from the fingertips F13 and F14 of the user located in higher positions (height h) are collected by the lens 16b and are applied to almost the lower half portion of the light receiving element 16a as spots S13 and S14. In other words, as a position where a laser beam is reflected is higher, the application position of the light receiving element 16a is lower, and the reflected laser beam applied to almost the lower half portion of the light receiving element 16a is blocked by the masking member 16c.

Figure 13:
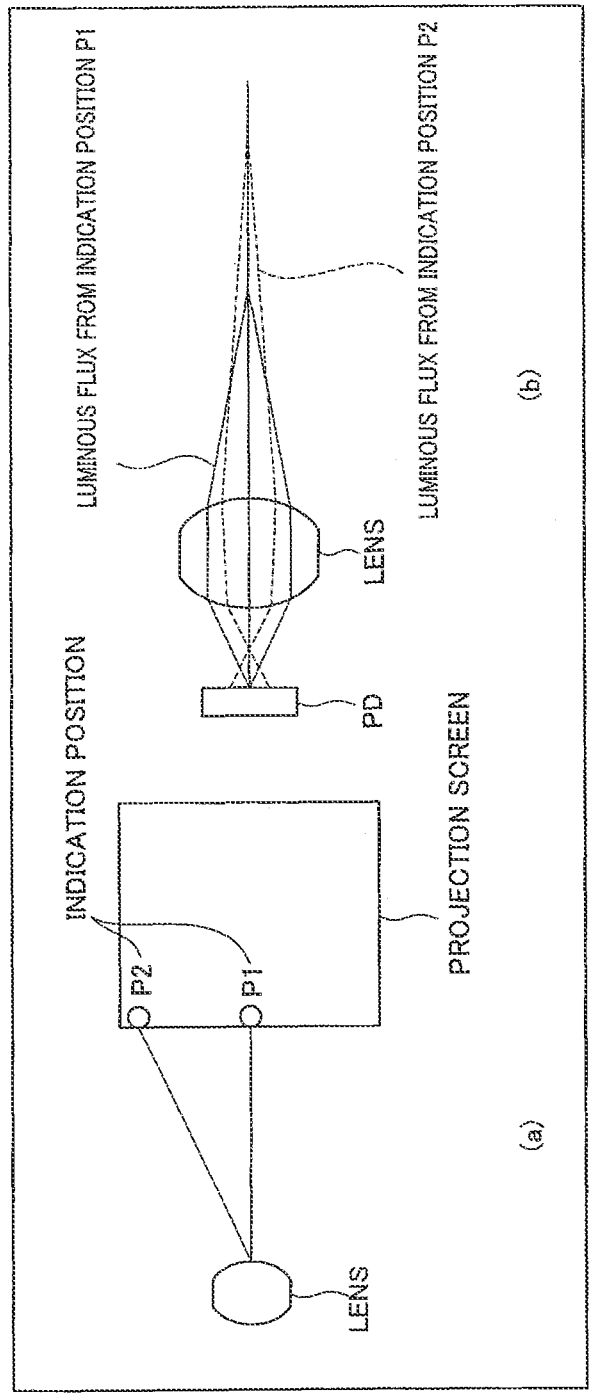
FIG. 13 illustrates aberration generated by a lens; view (a) shows a first indication position and a second indication position on a projection screen; view (b) shows luminous flux from a first indication position and a second indication position.

Here, in the cases where indication positions (reflection positions) are at a central portion P1 of an image and at an end P2 of the image as shown in view (a) of FIG. 13, spots of luminous fluxes collected by a lens and applied to a light receiving element (PD) are different from each other as shown in view (b) of FIG. 13. This is due to aberration generated by the lens, and the diameter of the spot from the end P2 is larger than the diameter of the spot from the central portion P1.

Also at to the reflected laser beam collected by the lens 16b and applied to the light receiving element 16a, similar aberration is generated. As the spot S14 shown in FIG. 8, for example, the spot diameter of the reflected laser beam that should be blocked by the masking member 16c is enlarged due to the aberration, and there is a concern that the reflected laser beam is not all blocked but is erroneously detected by the light receiving element 16a.

On the other hand, the masking member 16c according to this embodiment has the curved shape as described above, so that the reflected laser beam can be blocked at the light condensing point (focal point) of the lens 16b for the reflected laser beam (luminous flux) or near the light condensing point. Therefore, before the spot diameter of the reflected laser beam collected by the lens 16b is enlarged sufficiently to cause erroneous detection by the aberration, i.e., in a state where the spot diameter is not too enlarged, the reflected laser beam is blocked by the masking member 16c, whereby erroneous detection is prevented.

As long as the masking member 16c has the curved shape, the reflected laser beam at the end, the spot diameter of which is enlarged, can be blocked when the spot diameter is small. Therefore, as long as the masking member 16c has such a concave shape that the opposing ends thereof are closer to the lens 16b than the central portion thereof, various curved shapes can be employed.

The curved shape of the masking member 16c is preferably a curved shape connecting positions where the spot diameter of the reflected laser beam in a region from the center to the end is a prescribed value between the lens 16b and the light receiving element 16a, and with this curved shape, the masking member 16c having a constant width (the height of en edge) can block the reflected laser beam. Furthermore, the curved shape of the masking member 16c is preferably a curved shape connecting positions where the peak of the distribution of the point image intensity of the spot of the reflected laser beam is maximized (i.e., the light condensing point of the lens 16b) between the lens 16b and the light receiving element 16a, as shown in FIG. 7, and the reflected laser beams from the center to the end can be blocked by the masking member 16 in a state where the spot diameters of the reflected laser beams are minimized.

The same is also applied to the photoreceiver 17, and the masking member 17c thereof has the same curved shape as the masking member 16c.

Figure 9:
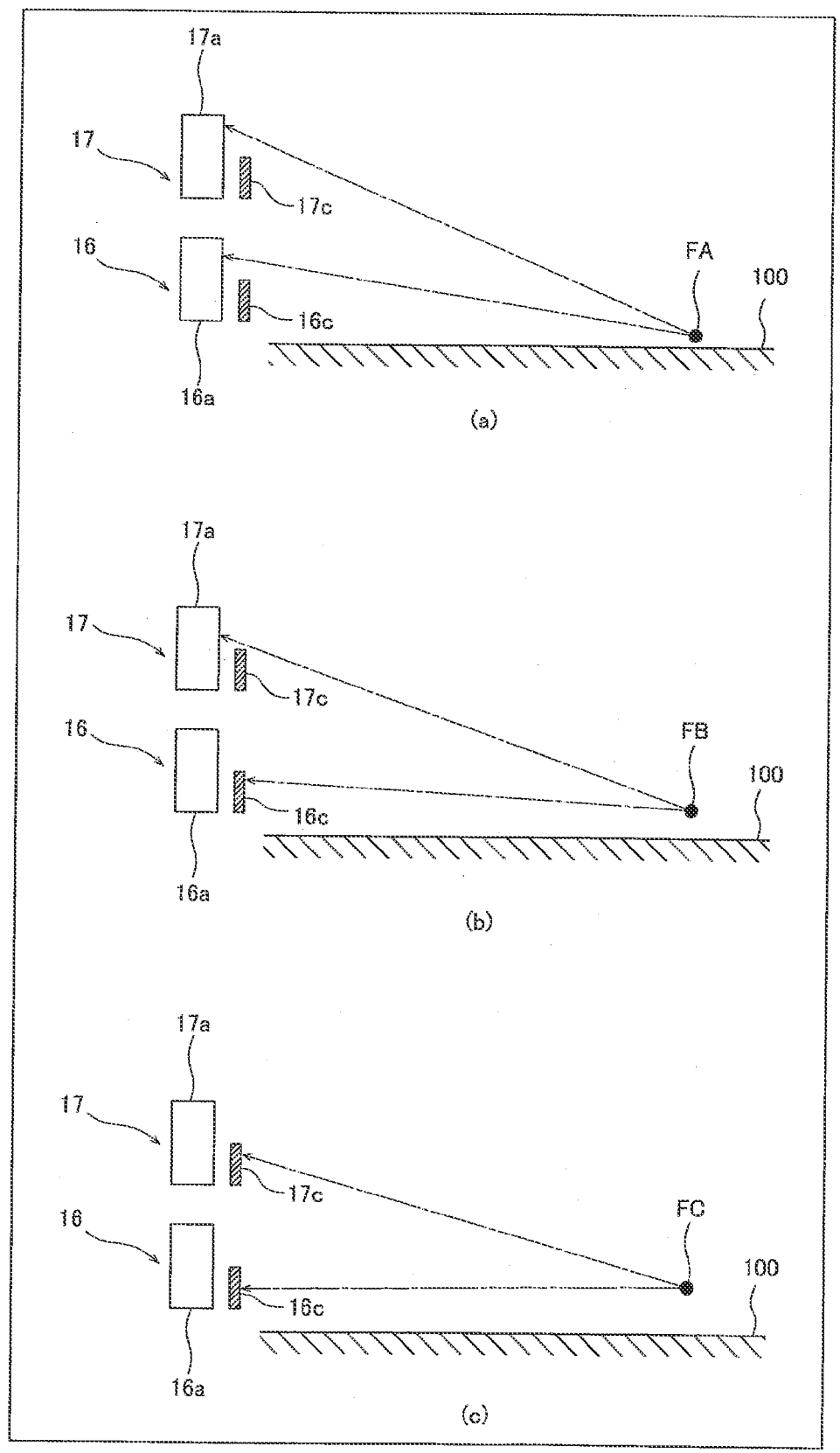
FIG. 9 is a side elevational view for illustrating the function of the masking portion of the image display apparatus according to the embodiment of the present invention; view (a) (b) and (c) show detection of a reflection positions, respectively, at a first, second and third height.

The two photoreceivers 16 and 17 having the aforementioned structure can detect the height position of the fingertip of the user reflecting a laser beam at three levels, as shown in FIG. 9. As shown in view (a) of FIG. 9, a laser beam reflected from the fingertip FA of the user at a height substantially equal to the height of the upper surface (operation image) of the table 100 is applied to the light receiving elements 16a and 17a without being blocked by the masking member 16c or 17c, and a light reception notifying signal is input from both the photoreceivers 16 and 17 into the control portion 13.

As shown in view (b) of FIG. 9, a laser beam reflected from the fingertip FB of the user at a height slightly higher than the height of the upper surface of the table 100 is not blocked by the masking member 17c but blocked by the masking member 16c and is applied to only the light receiving element 17a, and a light reception notifying signal is input from only the photoreceiver 17 into the control portion 13. As shown in view (c) of FIG. 9, a laser beam reflected from the fingertip FC of the user at a height from the upper surface of the table 100 higher than the height of the fingertip FB is blocked by both the masking members 16c and 17c and is not applied to the light receiving element 16a or 17a, and a light reception notifying signal is not input from the photoreceivers into the control portion 13.

According to this embodiment, the determination portion 14 makes the following determination on the basis of combinations of the detection results of the photoreceivers 16 and 17 according to the differences in height between the reflection positions FA, FB, and FC described above. According to this embodiment, the two photoreceivers are provided in the height direction to be capable of determining the three-level height positions, but three or more photoreceivers may be provided in the height direction to be capable of determining four or more-level height positions.

Figure 10:
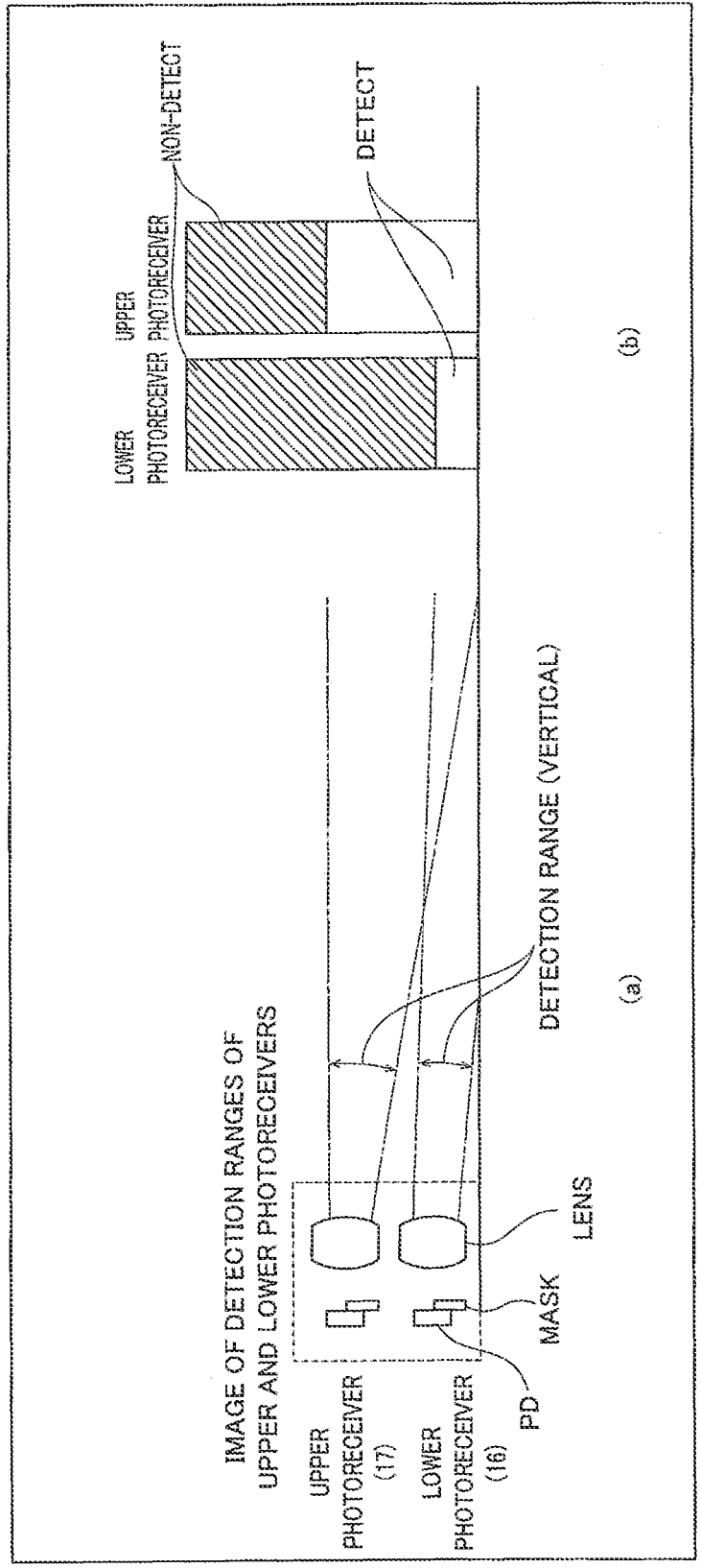
FIG. 10 illustrates the function of the light receiving portion of the image display apparatus according to the embodiment of the present invention; view (a) shows an image of detection ranges of upper and lower photoreceivers; and view (b) is a bar graph of detection ranges in upper and lower photoreceivers.

FIG. 10 illustrates states of detection and non-detection of the reflected laser beams according to the height positions shown in FIG. 9. The lower photoreceiver 16 and the upper photoreceiver 17 detect the reflected laser beam according to the height of the reflection point (fingertip), as shown in view (a) of FIG. 10, and the lower photoreceiver 16 detects reflection from the fingertip located between the upper surface of the table 100 and a slightly higher position while the upper photoreceiver 17 detects reflection from the fingertip located between the upper surface of the table 100 and a position higher than the slightly higher position, as shown in view (b) of FIG. 10.

Figure 11:
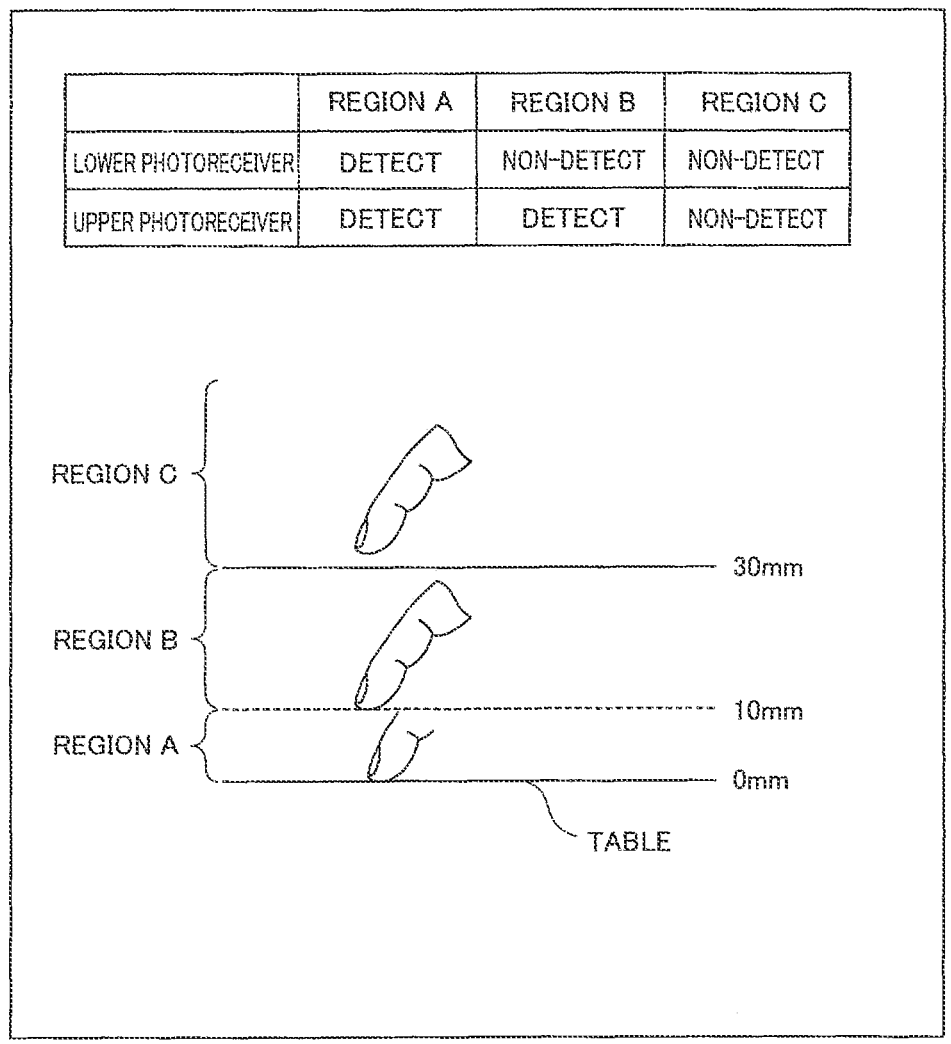
FIG. 11 illustrates determination processing performed by the image display apparatus according to the embodiment of the present invention.

According to this embodiment, a height from the upper surface (0 mm) of the table 100 at which the lower photoreceiver 16 cannot detect the reflected laser beam due to the masking member 16c is set to 10 mm, and a height from the upper surface (0 mm) of the table 100 at which the upper photoreceiver 17 cannot detect the reflected laser beam due to the masking member 17c is set to 30 mm, as shown in FIG. 11. Furthermore, in the determination portion 14, the combinations of detection results as to whether or not the photoreceivers 16 and 17 have detected the reflected laser beams are set in association with vertical regions A, B, and C.

In other words, a state where both the lower photoreceiver 16 and the upper photoreceiver 17 detect the reflected laser beam is set in association with the relatively low region A (0 mm to 10 mm) in the vicinity of the upper surface of the table, a state where the lower photoreceiver 16 does not detect the reflected laser beam but the upper photoreceiver 17 detects the reflected laser beam is set in association with the region B (10 mm to 30 mm) slightly higher than the upper surface of the table, and a state where neither the lower photoreceiver 16 nor the upper photoreceiver 17 detects the reflected laser beam is set in association with the region C (30 mm or more) higher than the region B from the upper surface of the table. The determination portion 14 determines the height position of the fingertip as these regions and determines the three-dimensional position of the fingertip by determining the two-dimensional position in the plane of the table on the basis of the scan timing of the projection image and the reflection timing (the timing of receiving the reflected laser beam), as described above.

Figure 12:
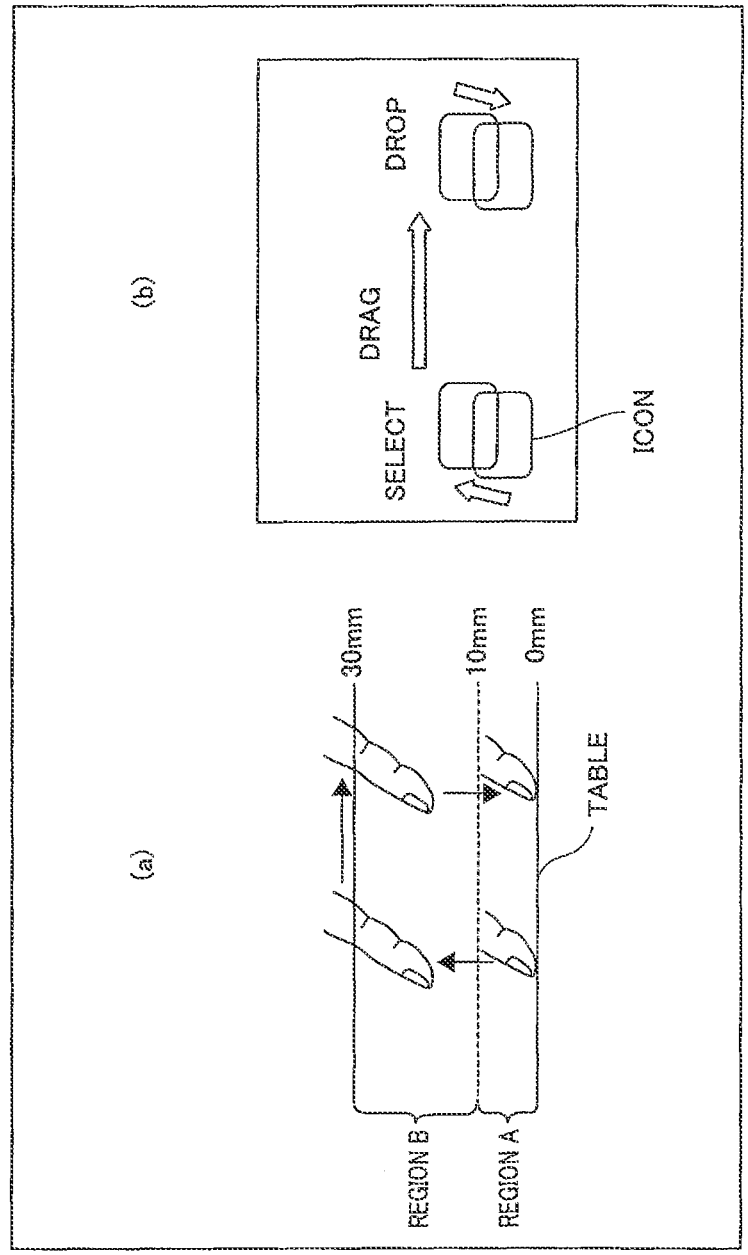
FIG. 12 illustrates an application example of the image display apparatus according to the embodiment of the present invention; view (a) shows a user's actions with respect to height regions for dragging and dropping an icon, and view (b) shows the result of such dragging and dropping operations.

The height regions are set in this manner, whereby the determination portion 14 can easily determine dragging and dropping operations shown in FIG. 12. The determination portion 14 can recognize the dragging and dropping operations of moving the icon and placing the icon on another position in the operation image 101 projected on the surface of the table in the following manner. When in the operation image 101 projected on the surface of the table, the user touches an icon image (i.e., an area of the table on which the icon image is projected) to select the same with the fingertip, raises this fingertip from the region A to the region B and moves the fingertip in a transverse direction, and touches a desired position in the operation image again as shown in view (a) of FIG. 12, the determination portion 14 determines that the icon has been dragged and dropped, and the control portion 13 moves the icon image to the aforementioned position that is touched again, as shown in view (b) of FIG. 12.

While the dragging and dropping operations are realized by touching the operation image in this embodiment, the present invention is not restricted to this, but another operation can be determined. Furthermore, while a user's operation is provided with a range in the height direction to determine the height by the region and a prescribed operation can be determined by a somewhat rough operation in this embodiment, according to the present invention, the height may alternatively be determined by coordinates. This allows high-accuracy determination of the three-dimensional position in addition to determination of the two-dimensional position.

According to this embodiment, as hereinabove described, when the indicator such as the implement such as the pointer or the finger of the user indicates a part of the operation image 101, the position of the indicator on a plane parallel to the projection surface can be detected on the basis of the scan timing and the timing of receiving the reflected laser beam by the light receiving elements 16*a* and 17*a*, and these light receiving elements 16*a* and 17*a* are arranged at the different heights from the projection surface, so that the determination portion 14 can determine a position in the operation image 101 indicated by the indicator in the plane parallel to the projection surface and in the height direction orthogonal to the projection surface on the basis of the detection results of these light receiving elements 16*a* and 17*a*. Thus, the three-dimensional position of the indicator with respect to the operation image 101 can be detected. Furthermore, according to where the indicator is located with respect to the operation image 101 having a certain width, aberration is generated in the reflected laser beam guided to the light receiving element 16*a* (17*a*) by the lens 16*b* (17*b*). For example, the spot diameter of the reflected laser beam guided by the lens 16*b* (17*b*) on the light receiving element 16*a* (17*a*) becomes larger when the indicator is located at the end of the operation image 101 than when the indicator is located at the central portion of the operation image 101, but the masking surface of the masking member 16*c* (17*c*) has the concave curved shape, so that the reflected laser beam can be restricted at a position where the spot diameter of the reflected laser beam is not large. Thus, erroneous detection of the light receiving element 16*a* (17*a*) can be prevented in the height direction orthogonal to the projection surface.

According to this embodiment, the masking surface of the masking member 16*c* (17*c*) has such the curved shape that the opposing ends thereof are closer to the lens than the central portion. Thus, the reflected laser beam requiring restriction can be easily masked by the masking surface having the curved shape, and hence erroneous detection of the light receiving element 16*a* (17*a*) can be reliably prevented.

According to this embodiment, the masking surface of the masking member 16*c* (17*c*) has the curved shape connecting the positions where the spot diameter of the reflected laser beam guided from the lens 16*b* (17*b*) to the light receiving element 16*a* (17*a*) is the prescribed value. Thus, the reflected laser beam requiring restriction can be efficiently masked before the spot diameter of the reflected laser beam becomes larger than the prescribed value. Thus, the reflected laser beam is effectively restricted with respect to the aberration of the reflected laser beam, and hence erroneous detection of the light receiving element 16*a* (17*a*) can be more reliably prevented.

According to this embodiment, as hereinabove described, the masking surface of the masking member 16*c* (17*c*) has the curved shape connecting the positions where the spot diameter of the reflected laser beam guided from the lens 16*b* (17*b*) to the light receiving element 16*a* (17*a*) is minimized. Thus, the reflected laser beam requiring restriction can be effectively masked at the position where the spot diameter of the reflected laser beam is minimized. Thus, the reflected laser beam is effectively restricted with respect to the aberration of the reflected laser beam, and hence erroneous detection of the light receiving element 16*a* (17*a*) can be more reliably prevented.

According to this embodiment, the masking surface of the masking member 16*c* (17*c*) has the curved shape connecting the positions where the peak of the distribution of the point image intensity of the spot of the reflected laser beam guided from the lens 16*b* (17*b*) to the light receiving element 16*a* (17*a*) is maximized. Thus, the reflected laser beam requiring restriction can be effectively masked at the position where the peak of the distribution of the point image intensity of the spot of the reflected laser beam is maximized. Thus, the reflected laser beam is effectively restricted with respect to the aberration of the reflected laser beam, and hence erroneous detection of the light receiving element 16*a* (17*a*) can be more reliably prevented.

According to this embodiment, the masking surface of the masking member 16*c* (17*c*) has the curved shape connecting the light condensing points of the reflected laser beam guided from the lens 16*b* (17*b*) to the light receiving element 16*a* (17*a*). Thus, the reflected laser beam requiring restriction can be effectively masked at the position of the light condensing point of the reflected laser beam. Thus, the reflected laser beam is effectively restricted with respect to the aberration of the reflected laser beam, and hence erroneous detection of the light receiving element 16*a* (17*a*) can be more reliably prevented.

According to this embodiment, the determination portion 14 is configured to determine a user's operation with the indicator on the projection image in a region divided in the height direction on the basis of a combination of the detection results of the light receiving elements 16a and 17a. Thus, a prescribed operation of the user with the indicator in the region divided in the height direction can be easily determined.

According to this embodiment, the determination portion 14 is configured to determine the dragging and dropping operations with the indicator on the icon image in the operation image 101 on the basis of the combination of the detection results of the light receiving elements 16a and 17a. Thus, it can be determined that the user has dragged and dropped the icon in the operation image 101 with the finger or the like on the basis of the combination of the detection results of the light receiving elements 16a and 17a, and hence the laser projector 1 can be employed as the user interface of a personal computer or the like, for example.

According to this embodiment, the masking surface of the masking member 16c (17c) is configured to block the reflected laser beam guided to the light receiving element 16a (17a) according to the height of the indicator in the height direction orthogonal to the projection surface. Thus, the reflected laser beam guided to the light receiving element 16a (17a) is restricted according to the height position of the indicator, and hence the height position of the indicator can be easily determined on the basis of the non-restricted laser beam.

According to this embodiment, the masking member 16c (17c) is formed by curving a plate-like member, whereby the masking surface of the masking member 16c (17c) can be easily formed concavely.

According to this embodiment, the determination portion 14 is configured to determine the three-level height positions of the indicator in the height direction orthogonal to the projection surface on the basis of the combinations of the detection results of the light receiving elements 16a and 17a. Thus, the three-level height positions of the indicator can be easily determined with a simple structure employing the two light receiving elements 16a and 17a.

According to this embodiment, the light receiving element 16a (17a) is configured to extend in a direction parallel to the projection surface. Thus, the reflected laser beam can be detected widely in the direction parallel to the projection surface.

According to this embodiment, the laser beam is scanned by the MEMS scan mirror 7. Thus, by employing the MEMS scan mirror, the size of the scan portion can be reduced, the power consumption of the scan portion can be reduced, and the processing speed of the scan portion can be increased.

The embodiment disclosed this time must be considered as illustrative in all points and not restrictive. The range of the present invention is shown not by the above description of the embodiment but by the scope of claims for patent, and all modifications within the meaning and range equivalent to the scope of claims for patent are further included.

For example, while the masking member is provided to cover almost the lower half portion of the light receiving element in the aforementioned embodiment, the present invention is not restricted to this. According to the present invention, the masking member may alternatively be provided to cover almost the upper half portion of the light receiving element. Also with this arrangement, erroneous detection of the reflected laser beam by the light receiving element can be prevented, and the three-dimensional position of the indicator can be determined on the basis of the detection result of the reflected laser beam.

While the two-dimensional image is projected in the aforementioned embodiment, the present invention is not restricted to this. According to the present invention, a three-dimensional image may alternatively be projected as the display image and the operation image. Furthermore, the three-dimensional position of the indicator may alternatively be determined with respect to the three-dimensional image.

While the color image is projected as the display image and the operation image in the aforementioned embodiment, the present invention is not restricted to this. According to the present invention, a monochromatic image may alternatively be projected with a monochromatic laser beam. Furthermore, the three-dimensional position of the indicator may alternatively be determined with respect to the monochromatic image.

While the laser beam for projecting the display image and the operation image is reflected from the indicator to determine the three-dimensional position of the indicator in the aforementioned embodiment, the present invention is not restricted to this. According to the present invention, an invisible laser beam such as an infrared laser beam separate from the laser beam for image projection may alternatively be scanned and projected together with the laser beam for image projection, and the three-dimensional position of the indicator may alternatively be determined with the invisible laser beam reflected from the indicator.

While the masking surface of the masking portion has the curved shape in the aforementioned embodiment, the present invention is not restricted to this. According to the present invention, the masking surface of the masking portion may alternatively have such a bent shape that the opposing ends thereof are closer to the lens than the central portion thereof.

While the masking portion is formed by curving the plate-like member in the aforementioned embodiment, the present invention is not restricted to this. According to the present invention, the masking portion may not be formed by curving the plate-like member as long as the masking surface of the masking portion has a concave shape. For example, the masking surface may alternatively be formed by cutting to a concave shape or may alternatively be concavely formed by pressing.

What is claimed is:

1. A position detection apparatus comprising:
    a plurality of light receiving portions arranged at different heights from a projection surface on which an image is projected by scanning a laser beam, receiving a reflected laser beam from an indicator indicating a part of a projection image;
    a lens guiding the reflected laser beam from the indicator to the light receiving portions;
    a masking portion arranged between the light receiving portions and the lens to extend in a direction parallel to the projection surface, having a masking surface restricting the reflected laser beam guided to the light receiving portions in a height direction orthogonal to the projection surface; and
    a determination portion determining a three-dimensional position in the projection image indicated by the indicator on the basis of detection results of the plurality of light receiving portions, wherein
    the masking surface of the masking portion has such a concave shape that opposing ends thereof are closer to the lens than a central portion thereof.

2. The position detection apparatus according to claim 1, wherein
    the masking surface of the masking portion has such a curved shape that the opposing ends thereof are closer to the lens than the central portion thereof.

3. The position detection apparatus according to claim 2, wherein the masking surface of the masking portion has the curved shape connecting positions where a spot diameter of the reflected laser beam guided from the lens to the light receiving portions is a prescribed value.

4. The position detection apparatus according to claim 3, wherein
the masking surface of the masking portion has the curved shape connecting positions where the spot diameter of the reflected laser beam guided from the lens to the light receiving portions is minimized.

5. The position detection apparatus according to claim 2, wherein
the masking surface of the masking portion has the curved shape connecting positions where a peak of a distribution of point image intensity of a spot of the reflected laser beam guided from the lens to the light receiving portions is maximized.

6. The position detection apparatus according to claim 2, wherein
the masking surface of the masking portion has the curved shape connecting light condensing points of the reflected laser beam guided from the lens to the light receiving portions.

7. The position detection apparatus according to claim 1, wherein
the determination portion is configured to determine a user's operation with the indicator on the projection image in a region divided in the height direction on the basis of a combination of the detection results of the plurality of light receiving portions.

8. The position detection apparatus according to claim 1, wherein
the determination portion is configured to determine dragging and dropping operations with the indicator on an icon image in the projection image on the basis of a combination of the detection results of the plurality of light receiving portions.

9. The position detection apparatus according to claim 1, wherein
the masking surface of the masking portion is configured to block the reflected laser beam guided to the light receiving portions according to a height of the indicator in the height direction orthogonal to the projection surface.

10. The position detection apparatus according to claim 1, wherein
the masking portion is formed by curving a plate-like member.

11. The position detection apparatus according to claim 1, wherein
the light receiving portions include a first light receiving portion and a second light receiving portion arranged at a position higher than a position of the first light receiving portion in the height direction orthogonal to the projection surface, and
the determination portion is configured to determine a height position of the indicator in the height direction orthogonal to the projection surface on the basis of a combination of detection results of the first light receiving portion and the second light receiving portion.

12. The position detection apparatus according to claim 11, wherein
the determination portion is configured to determine three-level height positions of the indicator in the height direction orthogonal to the projection surface on the basis of combinations of detection results of the first light receiving portion and the second light receiving portion.

13. The position detection apparatus according to claim 1, wherein
the light receiving portions are configured to extend in the direction parallel to the projection surface.

14. The position detection apparatus according to claim 1, wherein
the laser beam is scanned by a MEMS scan mirror.

15. The position detection apparatus according to claim 1, wherein
a three-dimensional image is projected by scanning the laser beam, and
the determination portion is configured to determine a three-dimensional position in a three-dimensional projection image indicated by the indicator on the basis of the detection results of the plurality of light receiving portions.

16. An image display apparatus comprising:
a laser beam source portion outputting a laser beam;
a scan portion scanning the laser beam output from the laser beam source portion to project an image on a projection surface;
a plurality of light receiving portions arranged at different heights from the projection surface, receiving a reflected laser beam from an indicator indicating a part of a projection image;
a lens guiding the reflected laser beam from the indicator to the light receiving portions;
a masking portion arranged between the light receiving portions and the lens to extend in a direction parallel to the projection surface, having a masking surface restricting the reflected laser beam guided to the light receiving portions in a height direction orthogonal to the projection surface; and
a determination portion determining a three-dimensional position in the projection image indicated by the indicator on the basis of detection results of the plurality of light receiving portions, wherein
the masking surface of the masking portion has such a concave shape that opposing ends thereof are closer to the lens than a central portion thereof.

17. The image display apparatus according to claim 16, wherein
the masking surface of the masking portion has such a curved shape that the opposing ends thereof are closer to the lens than the central portion thereof.

18. The image display apparatus according to claim 16, wherein
the determination portion is configured to determine a user's operation with the indicator on the projection image in a region divided in the height direction on the basis of a combination of the detection results of the plurality of light receiving portions.

19. The image display apparatus according to claim 16, wherein
the determination portion is configured to determine dragging and dropping operations with the indicator on an icon image in the projection image on the basis of a combination of the detection results of the plurality of light receiving portions.

20. The image display apparatus according to claim 16, wherein
the masking surface of the masking portion has a curved shape connecting positions where a spot diameter of the reflected laser beam guided from the lens to the light receiving portions is a prescribed value.

* * * * *